June 11, 1935.  R. L. INGRAM ET AL  2,004,757

MEAT HOLDER

Filed Sept. 3, 1932

Robert L. Ingram and
Herbert P. Adler
INVENTORS

WITNESS

BY
ATTORNEY

Patented June 11, 1935

2,004,757

UNITED STATES PATENT OFFICE 2,004,757

MEAT HOLDER

Robert L. Ingram and Herbert P. Adler, Chicago, Ill., assignors to Industrial Patents Corporation, Chicago, Ill., a corporation of Delaware Application September 3, 1932, Serial No. 631,674

5 Claims. (Cl. 146—217)

This invention relates to meat slicing machines and particularly revolves about the construction and arrangement of a holding, gripping or clamping plate provided with bored openings on the meat engaging face thereof, whereby the meat engaged and clamped in place by the holding plate will be firmly held during the slicing operation in a manner whereby the meat thus gripped will not tend to shift under the influence of the action of the slicing element and in a manner whereby the meat will not be torn or mutilated by the gripping action of the holding plate.

The invention is particularly adaptable for use in the conventional or ordinary slicing machines such as used in retail stores, and is particularly adaptable for use in the slicing of products such as ham, shaped meats in the form of blocks or the like, et cetera.

Referring now to the drawing in detail:

In Figure 3, the carrier bar is shown in section; practically an unobstructed side view of the holding plate appears in this figure.

Figure 1:
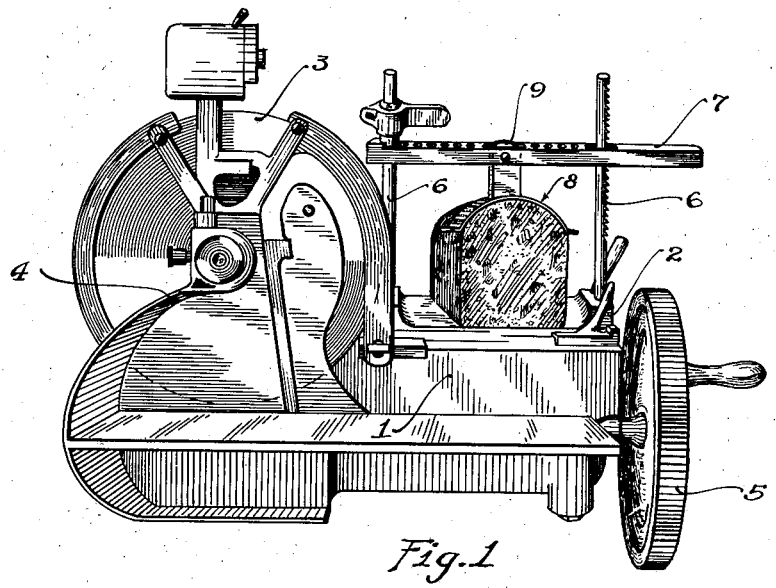
Figure 1 is an end view of a conventional or ordinary slicing machine typical of the class of machines to which the present invention is applicable, and to which it is shown applied.

Reference will now be made to the drawing in detail:

Therein, I designates the frame of the machine and thereupon, there is carried in any suitable manner a longitudinally moved or fed table 2 upon which the meat is carried and to which the meat is clamped while being sliced. The machine has any suitable cutting element as revolving cutter 3. The slicing operation is performed by effecting a relatively transverse cutting movement between the table on the one hand and the cutter 3 on the other hand.

In the construction shown, the cutter 3 is revolvably mounted upon a carrying part 4 therefor and the machine embodies mechanism—not shown—which is operated by hand wheel 5 which effects a periodic transverse relative cutting movement as between the cutter and the table and also for automatically effecting a forward longitudinal feed of the table and more particularly of the meat thereupon so as to bring successive portions of the meat to and under the action of the cutter. The mechanism whereby these cutting and feeding movements are accomplished is well known and further description in respect thereto is unnecessary at this time.

The table 2 has any suitable or usual upstanding bars or standards 6 and there is detachably and adjustably secured thereto a positionable transversely extending carrier bar 7. This carrier bar 7 is held in position on the upright standards in any well known way.

The transversely extending carrier bar 7 supports or has depending therefrom a meat clamping element or member 8 that comprises a lug 9 which is loosely but pivotally connected to the carrier bar 7 through the medium of a longitudinally extending pin or bolt 10. This pivotal connection is such as will allow a transverse swinging movement and also a longitudinal tilting movement to take place when or as the clamping member 8 is brought in position for clamping and holding a piece of ham or meat loaf to and upon the table.

Figure 2:
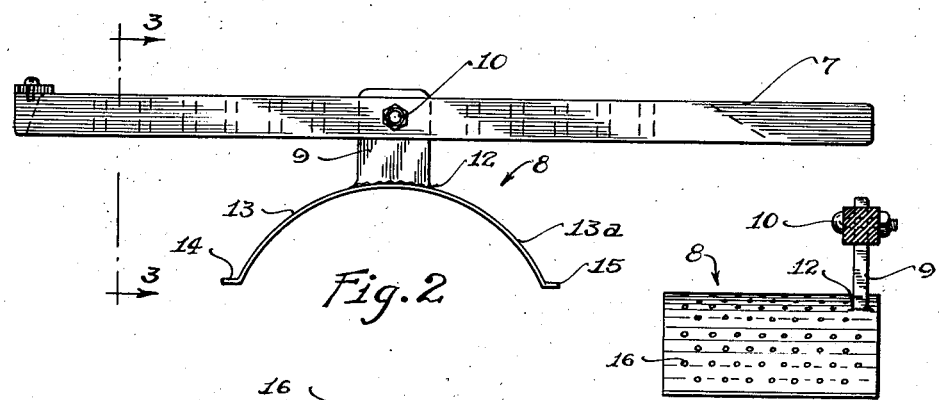
Fig. 2 is a view showing the holding plate and the adjustable transversely extending carrier bar therefor to which the holding plate is secured and by which it is carried. A transverse end elevation of the holding plate is practically shown in this figure.

The clamping member 8 also includes a curved plate 11 to the upper forward part of which the lug is welded as at 12. This plate 11—as appears in Figure 2—is curved in transverse cross section whereby there exist side portions 13 and 13ª thereof that extend outwardly and downwardly. These side portions terminate in horizontally and outwardly extending ends or end portions 14 and 15. It will be observed that substantially the entire under or meat engaging surface of the curved plate 11 is interspersed with bored openings 16 relatively uniformly arranged therein. An inspection of Figures 3 and 4 will show that these bored openings are arranged in rows both transversely and longitudinally, they are approximately ⅜ of an inch in diameter, extend through the plate, and are spaced approximately ½ of an inch center to center both longitudinally and transversely. The underside or meat engaging surface of the holding plate 11 is relatively straight—except where interrupted by the holes—in longitudinal direction. With the arrangement of the holes as shown, it will be noted that the plate can serve when pressed downwardly against the meat to firmly grip and hold the latter in place on the table but in a manner which will not tend to rupture or tear the meat thus held.

Figure 3:
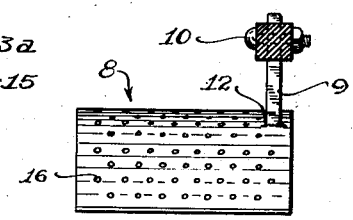
Fig. 3 is a longitudinal sectional view taken as on the plane indicated by the line 3—3 of Figure 2, looking in the direction of the arrows.
Figure 4:
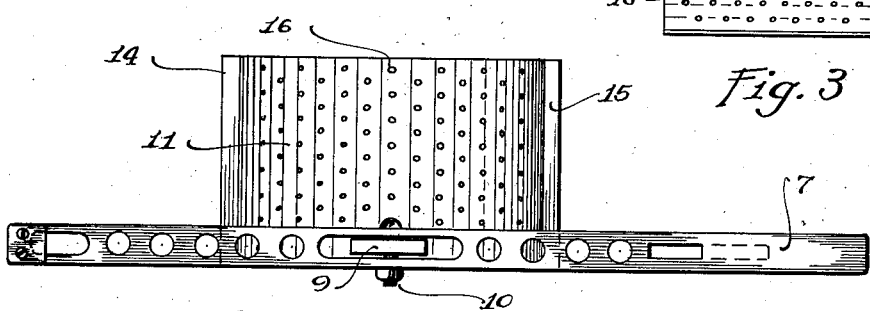
Fig. 4 is a plan view of the transversely extending carrier bar and of the holding plate carried thereby.

An inspection of Figure 3 shows that the lug 9 is secured to the plate at or near the forward end thereof. In other words, there is nothing to firmly resist the upward movement of the rear end of the gripping or holding plate as the plate is pressed downwardly against the meat. In short, the result of this construction is that the plate adjusts or accommodates itself to the meat being held both in a longitudinal direction and in a transverse direction because of the fact that the lug can tilt longitudinally and can swing transversely about the bolt 10 and the meat being sliced is more firmly gripped in the region or locality near the cutting plane and it is less firmly gripped and pressed in the region more remote from the cutting plane. This construction has been arranged because applicant desires the meat to be held the more securely in the immediate vicinity where the cutting forces apply and have the greatest tendency to move or shift the meat relative to the table upon which the meat is supported. The holding plate is preferably made of relatively thin sheet material, for example, sheet metal plate approximately $\frac{3}{32}$ of an inch in thickness and in the actual manufacture thereof, after the welding of the lug thereupon, the holding member 8 is preferably galvanized or tinned.

What is claimed is:

1. A meat slicing machine comprising in combination a frame, a table for supporting and holding the meat while being sliced, upright standards on said table, a meat cutting element, means for effecting relatively transverse reciprocatory movement between the meat cutting element on the one hand and said table on the other hand, whereby a cutting operation can be carried out on meat while supported on and by said table, and means for effecting longitudinal feed of the table in accordance with the periodic relative movement between the cutter and the table, said slicing machine being characterized in that it has employed in conjunction with said upright standards on the table a transversely extending vertically positionable carrying bar from which there is pivotally supported a gripping and holding plate, which plate in transverse cross section on the underside thereof is concave but has straight, longitudinally extending elements, and which plate has holes bored therein so as to provide a perforated gripping surface on the underside thereof.

2. A meat slicing machine comprising in combination a frame, a table for supporting and holding the meat while being sliced, upright standards in said table, a meat cutting element, means for effecting relatively transversely reciprocatory movement between the meat cutting element on the one hand and said table on the other hand, whereby a cutting operation can be carried out on meat while supported on and by said table, and means for effecting longitudinal feed of the table in accordance with the periodic relative movement between the cutter and the table, said slicing machine being characterized in that it has employed in conjunction with said upright standards on the table a transversely extending vertically positionable carrying bar from which there is pivotally supported a gripping and holding plate, which plate in transverse cross section on the underside thereof is concave but which has straight, longitudinally extending elements, and which plate has holes bored therein so as to provide a perforated gripping surface on the underside thereof, said holes being approximately three-eighths of an inch in diameter and relatively uniformly arranged throughout the gripping surface on half-inch centers.

3. A gripping member for use in a meat slicing machine comprising a carrying lug and a perforated meat engaging sheet of rolled metal plate approximately three thirty-seconds of an inch in thickness, the forward portion of which plate is welded to the lower end of the lug, which lug has a longitudinally extending bolt securing opening therethrough at the upper end thereof, the meat engaging sheet in transverse cross section being concave so that in said transverse cross section it curves downwardly and outwardly and terminates in horizontally and outwardly extending ends or edge portions, and which plate in longitudinal direction has straight, longitudinally extending meat engaging elements, said plate being provided in all sections except the extreme edge portion and the place where the lug is welded thereto with bored openings approximately three-eighths of an inch in diameter relatively uniformly spaced throughout the surface engaging portion thereof.

4. A meat slicing machine comprising in combination a frame, a table for supporting and holding the meat while being sliced, upright standards on said table, a meat cutting element, means for effecting relatively transverse reciprocatory movement between the meat cutting element on the one hand and said table on the other hand, whereby a cutting operation can be carried out on meat while supported on and by said table, and means for effecting longitudinal feed of the table in accordance with the periodic relative movement between the cutter and the table, said slicing machine being characterized in that it has employed in conjunction with said upright standards on the table a transversely extending vertically positionable carrying bar from which there is pivotally supported a gripping and holding plate, which plate in transverse cross section on the underside thereof is concave but which has straight, longitudinally extending elements, said gripping and holding plate being loosely mounted in respect to the transverse bar and freely swinging from said mounting whereby the gripping member is free to adjust itself by a transverse swinging movement relative to the meat engaged thereby said plate being mounted by means at the end of the plate in the approximate vicinity of the cutting plane, and which said gripping plate has holes bored therein so as to provide a perforated gripping surface on the underside thereof.

5. A gripping or holding plate for a meat slicing machine mounted upon a transversely extending vertically positionable carrying bar which said carrying bar is in turn movable upon upright standards, said gripping and holding plate being pivotally supported on said carrying bar, said gripping and holding plate being loosely mounted in respect to the transverse bar and freely swinging from said mounting whereby the gripping member is free to adjust itself by a transverse swinging movement relative to the meat engaged thereby, said plate being mounted by means at the end of the plate in the approximate vicinity of the cutting plane, and which said gripping plate has holes bored therein so as to provide a perforated gripping surface on the underside thereof.

ROBERT L. INGRAM.
HERBERT P. ADLER.